W. R. BARKER.
AGRICULTURAL IMPLEMENT.
APPLICATION FILED FEB. 4, 1919.
1,343,896.
Patented June 22, 1920.
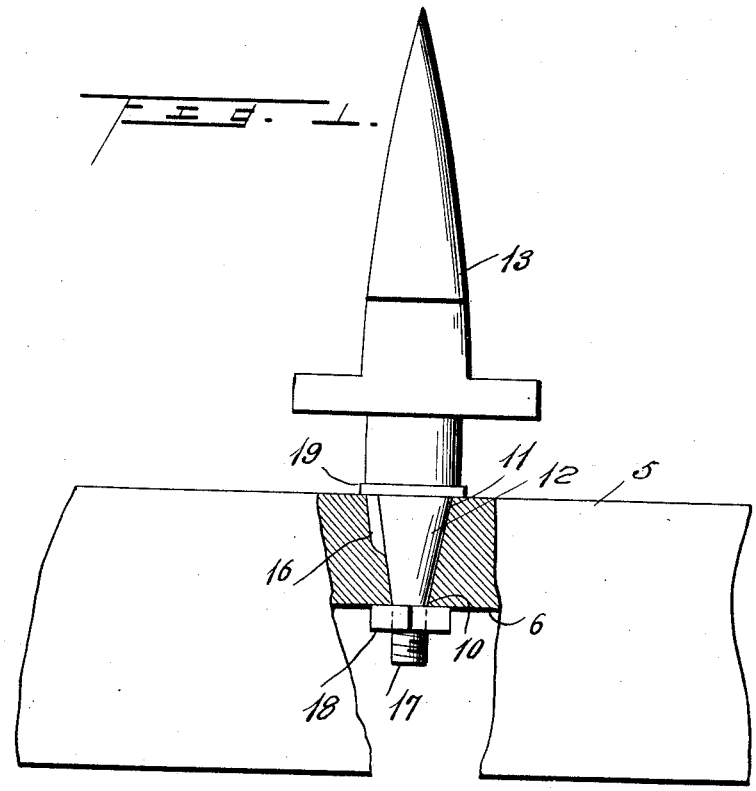
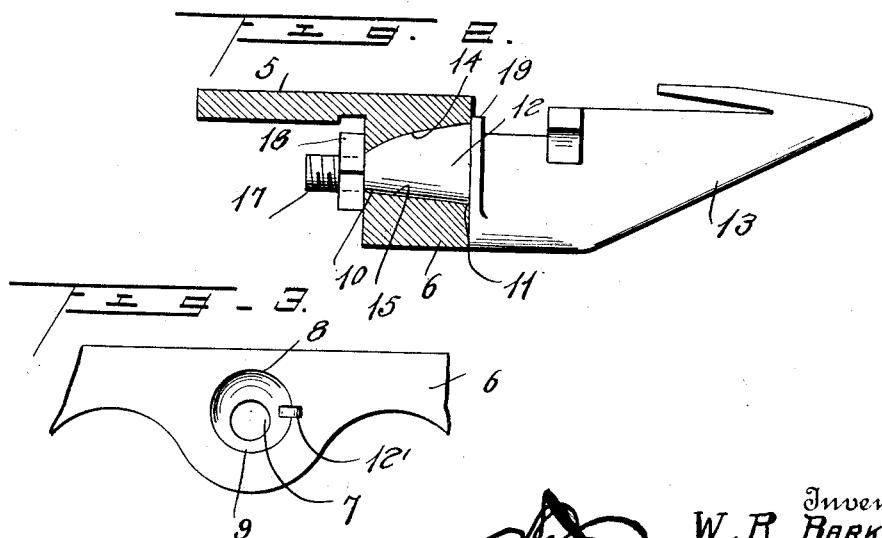
Inventor
W. R. BARKER.

UNITED STATES PATENT OFFICE.

WILLIAM R. BARKER, OF VAUZANT, MISSOURI.

AGRICULTURAL IMPLEMENT.

1,343,896.     Specification of Letters Patent.    Patented June 22, 1920.

Application filed February 4, 1919. Serial No. 274,984.

*To all whom it may concern:*

Be it known that I, WILLIAM R. BARKER, a citizen of the United States, residing at Vauzant, in the county of Douglas and State of Missouri, have invented certain new and useful Improvements in Agricultural Implements; and I do hereby declare the following to be a full, clear, and exact description of the invention, such as will enable others skilled in the art to which it appertains to make and use the same.

My invention relates to improvements in agricultural implements, such as moving machines, and has particular reference to the sickle bar structure thereof.

An important object of this invention is to provide means for reliably securing the finger or guard to the sickle bar structure in such a manner as to permit of its ready removal.

A further object of the invention is to provide a finger structure having a tapered shank adapted to fit within a tapered opening in the sickle, and means carried by the shank to securely retain the finger in its proper place and prevent any accidental movement of the same.

A further object of the invention is to provide a sickle bar structure of the character described, which, by virtue of its extreme reliability in use, will meet with commercial favor when placed upon the market.

Other objects and advantages of the invention will be apparent during the course of the following description:

In the accompanying drawing forming a part of this specification, and in which like numerals are employed to designate like parts throughout the same, Figure 1 is a plan view of a portion of a sickle bar having my improved finger or guard applied thereto, parts thereof being shown in section, Fig. 2 is a side elevation of the finger or guard applied to the sickle bar, the sickle bar being shown in section, and Fig. 3 is a front elevation of a portion of the sickle bar, the finger or guard being removed.

In the drawings, wherein, for the purpose of illustration, is shown the preferred embodiment of my invention, the numeral 5 generically designates the sickle bar of a mower structure. The sickle bar is provided along its lower edge portion with a horizontally disposed finger-engaging bar 6. The horizontally disposed bar 6 is provided with a plurality of vertically disposed apertures 7. As clearly shown in Figs. 2 and 3, the outer side walls of the openings 7 are provided with very slight inclines 8. The opposite side walls of the openings 7 are provided with more acute inclines, as shown at 9, thus causing the outer ends of the openings 7 to be of a greater width than the inner ends of the openings. The inner ends 10 of the openings 7 are disposed eccentrically with relation to the outer ends 11 of the openings 7. Extending from the outer ends 11 and into the side walls of the openings 7 are key slots 12'. The openings 7 are adapted for the shank portions 12 of fingers or guards 13. The shank portions 12 are provided with inner faces 14 contacting with the inclined faces 8 of the openings 7. The opposite sides of the shank portions 12 are provided with slight inclines 15 contacting with the inclined side walls 9 of the openings 7. Keys 16 are provided on the sides of the shanks 12, and are adapted to fit within the slots 12'. The outer end portions of the shanks 12 are provided with screw threads 17, having engagement with nuts 18 for securing the finger to the bar. Laterally projecting shoulders 19 are provided adjacent the shanks 12 and are adapted to contact with the outer side of the horizontally disposed bar 6.

It will be apparent that when the shank portion 12 is inserted within the opening 7, the accidental turning or removal of the shank 13 is absolutely prevented.

While I have shown and described the preferred embodiment of my invention, it is understood that I may make such minor changes in arrangement and construction of parts as will remain within the spirit of the invention and the scope of the appended claims.

Having thus described my invention, what I claim is:

1. The combination with a sickle bar having a plurality of tapering openings extending therethrough, each opening having its center at one end positioned out of the horizontal plane of the center at the opposite end of the opening; of a plurality of fingers having shanks extending into said openings and conforming to the contour thereof, keys formed upon the sides of the shanks, the side walls of the openings having slots receiving said keys, and means to secure the guards to the sickle bar.

2. The combination with a sickle bar having a plurality of tapering openings, each opening having its center at one end positioned out of the horizontal plane of the center at the opposite end of the opening, of a plurality of finger guards having shanks extending through said openings and conforming to the contour thereof, keys formed upon the sides of the shanks, the side walls of said openings having slots receiving said keys, and nuts having threaded engagement with the forward end portions of said shanks and adapted to securely retain the guards in engagement with the sickle bar.

In testimony whereof I affix my signature in presence of two witnesses.

WILLIAM R. BARKER.

Witnesses:
W. C. SHANNON,
LELHA SHANNON.